United States Patent [19]

Hunger et al.

[11] 4,074,053
[45] Feb. 14, 1978

[54] ALDEHYDES OF 2-HYDROXY-NAPHTHALENE-3-CARBOXYLIC ACID ARYLIDES

[75] Inventors: Klaus Hunger, Kelkheim, Taunus; Theodor Papenfuhs, Frankfurt am Main, both of Germany

[73] Assignee: Hoechst Aktiengesellschaft, Franfurt am Main, Germany

[21] Appl. No.: 670,997

[22] Filed: Mar. 26, 1976

Related U.S. Application Data

[62] Division of Ser. No. 489,538, July 18, 1974, Pat. No. 3,947,516.

[30] Foreign Application Priority Data

July 20, 1973   Germany ............................ 2337023

[51] Int. Cl.$^2$ ............................................. C07D 235/26
[52] U.S. Cl. ............................... 548/305; 260/250 P; 260/256.4 Q; 260/326 N
[58] Field of Search ....................................... 260/309.2

[56] References Cited

U.S. PATENT DOCUMENTS 3,875,200   4/1975   L'Eplattenier et al. .......... 260/439 R

OTHER PUBLICATIONS

Choubal et al. J. Indian Chem. Soc. 1958, vol. 35, pp. 860–864.
Kamel et al. Chem. Abst. 1966, vol. 64, Column 9707.
Rees et al. Chem. Abst. 1971, vol. 75, No. 98418p.

*Primary Examiner*—Natalie Trousof

*Attorney, Agent, or Firm*—Curtis, Morris & Safford

[57] ABSTRACT

Aldehydes of a 2-hydroxy-naphthalene-3-carboxylic acid arylide of the general formula

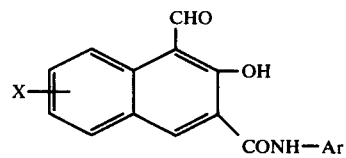

in which X represents a hydrogen, chlorine or bromine atom, and Ar represents a naphthyl group, a benzimidazolone, chlorobenzimidazolone, quinazolone, quinoxaline, phthalimide, phthalazine group or a phenyl group which may carry 1 to 3 lower alkyl, lower alkoxy, lower alkylsulfonyl, lower carboalkoxy, halogen, trifluoromethyl, nitro, cyano, lower alkanoylamino, benzoylamino, carboxamido or sulfoamido groups, and a process for their preparation wherein the corresponding 2-hydroxy-naphthalene-3-carboxylic acid arylide is reacted in a lower aliphatic carboxylic acid with hexamethylene tetramine and a mineral acid.

These aldehydes are valuable intermediate products for the synthesis of optical brighteners, pharmaceuticals and, in particular, of azamethine pigments which are obtained by condensation of these aldehydes with suitable amines. The pigments thus obtained are distinguished by good fastness properties and are expecially suitable for the printing of paper and the coloring of lacquers, varnishes and plastics.

2 Claims, No Drawings

ALDEHYDES OF 2-HYDROXY-NAPHTHALENE-3-CARBOXYLIC ACID ARYLIDES

This is a division of application Ser. No. 489,538, filed July 18, 1974, now U.S. Pat. No. 3,947,516, granted Mar. 30, 1976.

The present invention relates to novel aldehydes of 2-hydroxy-naphthalene-3-carboxylic acid arylides of the general formula I

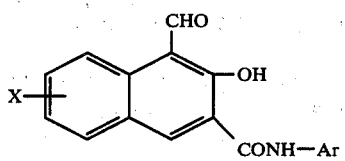

in which X stands for a hydrogen, chlorine or bromine atom, and Ar stands for a naphthyl group, a phenyl group which may carry one to three lower alkyl, lower alkoxy, lower alkylsulfonyl, lower carbalkoxy, halogen, trifluoromethyl, nitro, cyano, lower alkanoylamino, carboxamido or sulfoamido groups, a benzimidazolone, chlorobenzimidazolone, quinazolone, quinoxaline, phthalimide or phthalazine group.

The present invention moreover relates to a process for preparing these aldehydes, wherein a 2-hydroxy-naphthalene-3-carboxylic acid arylide of the general formula II

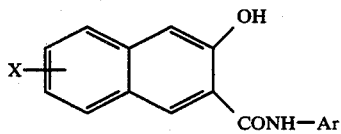

in which X and Ar are defined as above, is reacted with hexamethylene tetramine in the presence of a lower aliphatic carboxylic acid.

As radicals Ar in the general formula II, there are mentioned, for examples: Phenyl, ortho-, meta-, para-tolyl, ortho-, meta-, paramethoxyphenyl, ortho-, meta-, para-ethoxyphenyl, ortho-, meta-, para-chlorophenyl, ortho-, meta-, para-bromophenyl, ortho-, meta-, para-nitrophenyl, 2,4-dimethylphenyl, 2,5-dimethoxyphenyl, 2,4-dichlorophenyl, 2,5-dichlorophenyl, 2,4,5-trichlorophenyl, 2-chloro-3-methyl-phenyl, 2-chloro-4-methyl-phenyl, 2-chloro-5-methyl-phenyl, 3-chloro-2-methylphenyl, 4-chloro-2-methyl-phenyl, 2-methoxy-5-chlorophenyl, 2,5-dimethoxy-4-chlorophenyl, 2,4-dimethoxy-5-chlorophenyl, 2-methoxy-4-chloro-5-methyl-phenyl, 4-acetylamino-phenyl, 4-benzoylamino-phenyl, benzimidazolyl, phthalimide, quinoxalyl, quinazolyl or phthalazinyl. Further examples of compounds of the general formula II are cited in Colour Index, 3rd edition, Vol. 4, pages 4356 to 4360. By the term "lower", there are to be understood according to this invention groups containing 1 to 4 carbon atoms.

For the reaction of the 2-hydroxy-naphthoic acid arylide with hexamethylene tetramine, the starting compound is dissolved or suspended, generally, in two to ten times its amount of an aliphathatic carboxylic acid and the solution or suspension is heated for a prolonged time to temperatures of up to 120° C, preferably from 80° to 100° C, the addition of a small amount of a mineral acid, such as sulfuric acid or hydrochloric acid being necessary except for trifluoroacetic acid used as the carboxylic acid. The acid may be added directly in admixture with the carboxylic acid or subsequently. Suitable lower carboxylic acids are, above all, acetic acid, but also propionic acid, butyric acid or valeric acid, moreover, dicarboxylic acids, such as adipic acid or malonic acid, or halogenated fatty acids, such as chloroacetic acid, trichloroacetic acid or trifluoroacetic acid.

Hexamethylene tetramine may also be replaced by a likewise reacting mixture of ammonia and formaldehyde, these two components being used in an aqueous solution or in gaseous state.

Hexamethylene tetramine is employed in a stoichiometric amount or in a small excess. In addition, para-formaldehyde may also be used in a molar ratio of 1:1 to 3:1, calculated on the starting compound.

In this manner, the aldehydes of the invention are obtained with a good yield and in high purity. These aldehydes are valuable intermediate products for the synthesis of optical brighteners, pharmaceuticals and, in particular, of azamethine pigments which are obtained by condensation of these aldehydes with suitable amines, for example with aniline which may carry 1 to 3 chlorine or bromine atoms, methyl, ethyl, methoxy, ethoxy, nitro, alkyl- or arylsulfonyl groups. The pigments thus obtained are distinguished by good fastness properties and are especially suitable for the printing of paper and the coloring of lacquers, varnishes and plastics.

The following Examples illustrate the invention.

EXAMPLE 1

26.3 Grams of 2-hydroxy-3-naphthoyl-aniline were mixed with 100 ml of glacial acetic acid, 14 g of hexamethylene tetramine and 14 g of paraformaldehyde. The mixture was heated to 85° C, whereupon a clear yellow solution was obtained, to which 20 ml of concentrated hydrochloric acid were added dropwise. Stirring was then continued for 30 minutes at 85° C. The mixture was then cooled to 5° C, the precipitated product was suction-filtered, washed with water until free from acid and dried. 16.9 Grams of faintly yellow 1-aldehyde of 2-hydroxy-3-naphthoylaniline were obtained, melting point: 211° C.

EXAMPLE 2

35.7 Grams of 2-hydroxy-3-naphthoyl-2',5'-dimethoxy-4'-chloroaniline were heated to 115° C together with 14 g of hexamethylene tetramine and 10 g of paraformaldehyde in 200 ml of glacial acetic acid. After 15 minutes, 20 ml of concentrated hydrochloric acid were added. Heating was continued at 116° C for 3 hours, the mixture was then cooled below 10° C, suctionfiltered and the precipitated crystals were washed with water until free from acid. 32 g of faintly yellowish crystals of 1-aldehyde-2-hydroxy-3-naphthoyl-2',5'-dimethoxy-4'-chloroaniline were obtained, m.p. 236° C.

EXAMPLE 3

27.7 Grams of 2-hydroxy-3-naphthoyl-2'-methyl-aniline were mixed with 12 g of hexamethylene tetramine and 12 g of paraformaldehyde and the mixture was heated to 100° C in 200 ml of glacial acetic acid. After a clear solution had been obtained, 15 ml of concentrated hydrochloric acid were added, and heating was continued at 90° C for another 2 hours. The mixture was then cooled with ice to 5°–10° C, whereupon the 1-aldehyde of 2-hydroxy-3-naphthoyl-2'-methyl-aniline crystallized. Yield: 12.9 g, m.p. 172°–174° C.

EXAMPLE 4

32 Grams of 2-hydroxy-3-naphthoyl-4'-acetylamino-aniline were heated to 90° C together with 100 ml of glacial acetic acid, 14 g of hexamethylene tetramine and 14 g of paraformaldehyde. After a solution had been obtained, 20 ml of concentrated hydrochloric acid were added. Stirring was continued for 2 hours at 90° C, the solution was cooled to 5° C and the white crystallized precipitate of 1-aldehyde-2-hydroxy-3-naphthoyl-4'-acetylamino-aniline was suction-filtered, washed and dried. Yield: 18.9 g, m.p. 234° C.

EXAMPLE 5

63.8 Grams of 2-hydroxy-3-naphthoyl-(5'-aminobenzimidazolone) were mixed with 28 g of hexamethylene tetramine and 5 g of paraformaldehyde and mixed while stirring with 60 ml of glacial acetic acid and 75 ml of concentrated hydrochloric acid for 4 hours at 100° C. The clear solution was allowed to cool, the precipitated product was suction-filtered, washed with water and dried. 54.6 g of 1-aldehyde of 2-hydroxy-3-naphthoyl(5'-amino-benzimidazolone) were obtained, m.p. 260° C.

EXAMPLE 6

9.8 Grams of 2-hydroxy-3-naphthoyl-2',5'-dimethoxy-4'-chloroaniline of 91.5% strength and g of urotropin were slowly heated in 30 ml of trifluoroacetic acid. At 60° C, a solution was obtained. Temperature was raised to 95° C which was maintained for 30 minutes. The hot reaction mixture was then placed onto 200 g of ice water. The precipitated product was suction-filtered, carefully washed with water and dried. The 1-aldehyde of 2-hydroxy-3-naphthoyl-2',5'-dimethoxy-4'-chloroaniline was uniform according to thin-layer chromatography. Yield: 9.5 g, m.p. 236° C.

We claim:
1. An aldehyde of a 2-hydroxynaphthalene-3-carboxylic acid arylide of the formula

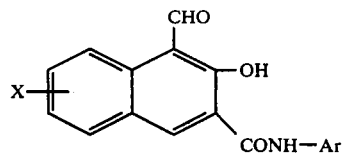

wherein X is hydrogen, chlorine or bromine and Ar is benzimidazolonyl or chlorobenzimidazolonyl, the amide nitrogen being connected to a ring carbon of the benzo-moiety of said benzimidazolonyl or chlorobenzimidazolonyl.

2. The compound of claim 1 in which X is hydrogen and Ar is 5-benzimidazolonyl.

* * * * *